(No Model.)

L. C. ASHLEY.
Windmill.

No. 230,988.  Patented Aug. 10, 1880.

WITNESSES:
F. McArdle
C. Sedgwick

INVENTOR:
L. C. Ashley
BY Munn & Co.
ATTORNEYS.

United States Patent Office.

LEWIS C. ASHLEY, OF DETROIT, MICHIGAN, ASSIGNOR TO HIMSELF AND CHARLES H. WILCOX, OF SAME PLACE.

WINDMILL.

SPECIFICATION forming part of Letters Patent No. 230,988, dated August 10, 1880.

Application filed April 30, 1880. (No model.)

*To all whom it may concern:*

Be it known that I, LEWIS C. ASHLEY, of Detroit, in the county of Wayne and State of Michigan, have invented a new and useful Improvement in Windmills, of which the following is a specification.

Figure 1:
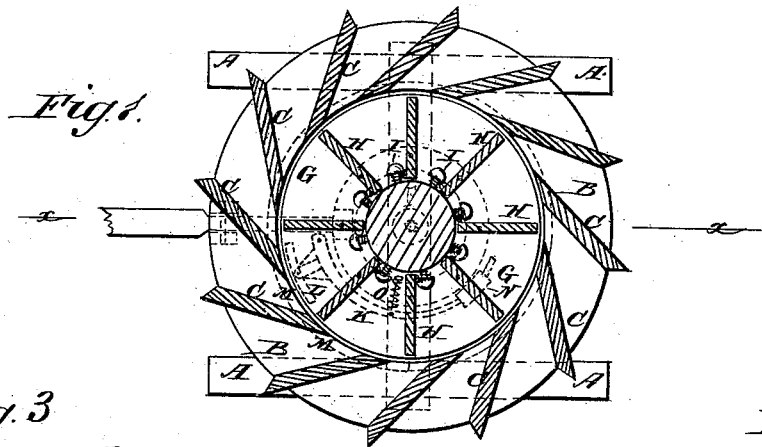
Figure 3:
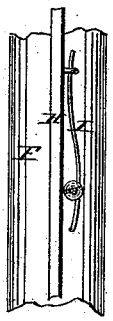
Figure 2:
Figure 4:
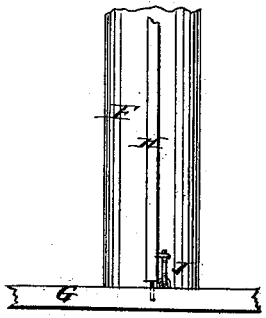
Figure 5:
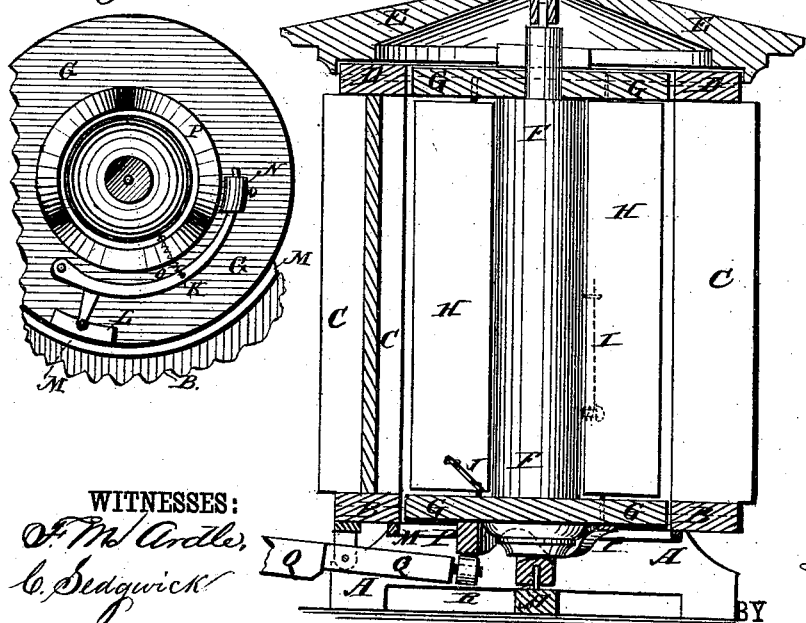

Figure 1 is a sectional plan view of the improvement. Fig. 2 is a sectional elevation taken through the line $x\,x$, Fig. 1. Fig. 3 is a side elevation of a part of the wind-wheel, showing a spring for controlling the wings. Fig. 4 is a side elevation of a part of the wind-wheel, showing a brace for controlling the wings. Fig. 5 is an inverted plan view, showing the brake.

The object of this invention is to furnish windmills simple in construction, inexpensive in manufacture, and not liable to get out of order.

The invention consists in constructing a windmill, as will be hereinafter fully described.

Similar letters of reference indicate corresponding parts.

A represents the base-frame of the mill, which may be made of any desired width, so as to give a firm support to the mill. To the base-frame A is attached a ring-frame, B, to which are attached the lower ends of the boards or plates C. The plates C serve as chutes to guide the wind against the wings of the wind-wheel, and are set at such an inclination that the wind will strike the said wings about at right angles.

The upper ends of the chutes C are attached to and connected by a ring-frame, D, to which may be attached a roof, E, to cover and protect the wheel.

F represents the shaft of the wind-wheel, the lower end of which is pivoted to the base-frame A, and its upper end is pivoted to a support attached to the ring-frame D, or to the roof E.

To the upper and lower parts of the shaft F are attached ring-plates or flanges G, to which are pivoted the ends of the wings H at points at a distance from the inner edges of the said wings equal to about one-third of their width. The wings H are held forward against the wind by springs I, which are attached at one end to the shaft F, and their other ends pass through keepers attached to the wings H. With this construction, when the force of the wind exceeds the resisting power of the springs I, the said springs will yield and allow the wings H to turn upon their pivots, bringing their edges to the wind. The same thing may be accomplished by the inclined braces J, the upper ends of which are pivoted to the lower parts of the wings H, and their lower ends are pivoted to the lower flange, G. With this construction, when the force of the wind exceeds the resistance of the weight of the wings H, the said wings turn upon their pivots, the braces J causing them to rise in turning, so that their weight will bring them back to their former position as soon as the force of the wind has decreased. The latter construction I prefer, as there are no springs to get out of order.

The motion of the wind-wheel is further controlled by a brake, the lever K of which is pivoted at one end to the lower flange, G, and has a brake-shoe, L, pivoted to a support attached to it near its pivoted end, to rest and rub against a ring, M, attached to the inner part of the ring-frame B.

To the free end of the brake-lever K is attached a weight, N, and to the outer part of the said lever K is attached the end of a spiral or other spring, O, the other end of which is attached to the shaft F or other suitable support. With this construction, when the velocity of the wind-wheel exceeds the rate for which the spring O has been set, the weight N is thrown outward by centrifugal force, holding the brake-shoe L against the ring M with a force proportioned to the velocity of the wind-wheel. When the speed of the wind-wheel is reduced to the ordinary rate the lever K and weight N are drawn inward by the spring O, withdrawing the brake-shoe L from the friction-ring M, and allowing the wind-wheel to revolve free.

To the lower side of the lower flange, G, is attached a ring, P, the lower edge of which is scalloped, forming a series of cams.

Q is a lever pivoted to a support attached to the lower side of the circular frame B in such a position that the friction-wheel R, pivoted to its inner end, may rest against and roll along the scalloped or cam edge of the ring or flange P, so that the outer end of the lever Q will be vibrated to work a pump or other mechanism by the revolution of the wind-wheel. The outer end of the lever Q is made sufficiently heavy or is weighted to hold the friction-wheel R firmly against the cam-ring P.

Having thus fully described my invention, I claim as new and desire to secure by Letters Patent—

1. In a windmill, the combination, with the wind-wheel, of a brake-lever, K, having shoe at one end and weight at the other, the spring O, and the friction-ring M, all arranged as shown and described, for the purpose specified.

2. In a windmill, the combination, with pivoted wings H and shaft F, of the springs I, attached at one end to said shaft and having the other passed through keepers on the wings, as set forth.

3. In a windmill, the combination, with the shaft F and pivoted wings H, of the inclined pivoted braces J, substantially as herein shown and described, whereby the wings H are brought into and held in the wind by their own weight, as set forth.

LEWIS CLARK ASHLEY.

Witnesses:
 WM. GLOX,
 ED. RIOPELLE.